（12）United States Patent
Higemoto

(10) Patent No.: US 12,438,568 B2
(45) Date of Patent: Oct. 7, 2025

(54) WIRELESS COMMUNICATION DEVICE

(71) Applicant: LAPIS Technology Co., Ltd., Yokohama (JP)

(72) Inventor: Nobumasa Higemoto, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 59 days.

(21) Appl. No.: 18/508,179

(22) Filed: Nov. 13, 2023

(65) Prior Publication Data

US 2024/0178876 A1 May 30, 2024

(30) Foreign Application Priority Data

Nov. 25, 2022 (JP) ................. 2022-188477

(51) Int. Cl.
*H04B 1/40* (2015.01)
*H02J 50/27* (2016.01)
*H04B 1/16* (2006.01)

(52) U.S. Cl.
CPC ............... *H04B 1/40* (2013.01); *H02J 50/27* (2016.02); *H04B 1/1615* (2013.01)

(58) Field of Classification Search
CPC .......... H04B 1/06; H04B 1/16; H04B 1/1607; H04B 1/1615; H04B 1/22; H04B 1/24; H04B 1/40; H04J 50/27; H04W 4/80; H04W 52/0274
USPC ............... 370/219, 316, 319, 325, 340, 345; 455/41.1, 67.11, 67.14, 226.1, 336–338
See application file for complete search history.

(56) References Cited

U.S. PATENT DOCUMENTS

| | | | |
|---|---|---|---|
| 2010/0164725 A1* | 7/2010 | Ganz | G06K 19/0723 340/572.7 |
| 2011/0043339 A1* | 2/2011 | McGregor | G06K 19/07372 340/10.4 |
| 2012/0068827 A1* | 3/2012 | Yi | G01D 5/185 340/10.1 |
| 2012/0149301 A1* | 6/2012 | Wiley | H02J 50/60 455/67.11 |
| 2017/0222491 A1* | 8/2017 | Von Novak, III | H02J 50/90 |
| 2019/0180163 A1* | 6/2019 | Awheda | G06K 19/0716 |

FOREIGN PATENT DOCUMENTS

JP 2020109917 7/2020

* cited by examiner

*Primary Examiner* — Young T. Tse
(74) *Attorney, Agent, or Firm* — JCIPRNET

(57) ABSTRACT

A wireless communication device of the disclosure includes: an antenna, in response to receiving a radio wave, transmitting a radio frequency signal corresponding to the radio wave; a detector, detecting the radio frequency signal to obtain a detection signal; a circuit part, performing signal processing based on reception data obtained by performing demodulation processing on the detection signal; a regulator, in response to receiving an external power source voltage from an external source, generating and supplying an internal power source voltage for operating the circuit part to the circuit part; and a radio wave detection control part, detecting whether or not the antenna is receiving a radio wave and stopping a generation operation of the internal power source voltage by the regulator in response to the antenna not receiving the radio wave.

4 Claims, 3 Drawing Sheets

WIRELESS COMMUNICATION DEVICE

CROSS-REFERENCE TO RELATED APPLICATION

This application claims priority under 35 USC 119 from Japanese Patent application No. 2022-188477 filed on Nov. 25, 2022, the disclosure of which is incorporated by reference herein.

BACKGROUND

Technical Field

The disclosure relates to a wireless communication device.

Description of Related Art

In recent years, communication systems based on RFID (radio frequency identification) have been used in fields such as product management. In the RFID-based communication system, contactless short-range wireless communication using radio waves is used between an RFID tag that stores information and a reader/writer that reads and writes the information.

RFID tags are broadly classified into active RFID tags that are equipped with a driving battery and passive RFID tags that do not have their own power source. In active RFID tags, in order to increase battery capacity and speed up charging, an active RFID tag has been proposed in which a capacitor having a structure in which a dielectric layer is sandwiched between upper and lower conductor layers is provided as a battery (e.g., see Patent Document 1, Japanese Patent Application Laid-Open (JP-A) No. 2020-109917).

In addition to passive RFID tags that operate using only the power obtained by rectifying the radio wave from the interrogator (master unit), RFID tags that operate by receiving power from an external power source are known.

Regarding the RFID tags operate using only the power obtained by rectifying the radio waves from the interrogator, since it is necessary to receive power from the interrogator as a radio wave to operate the entire circuit, there is a problem in that the communication distance is short.

On the other hand, regarding the RFID tags using an external power source, the tag side is unable to know the timing of the interrogator emitting a signal, so the tag is operated in a constant operating state, waiting for the interrogator to initiate communication. This means that power is also consumed during the waiting time, resulting in high power consumption.

The purpose of this disclosure is to provide a wireless communication device that may reduce power consumption in a wireless communication device that operates by receiving power from an external power source.

SUMMARY

The wireless communication device of the disclosure includes: an antenna, in response to receiving a radio wave, transmitting a radio frequency signal corresponding to the radio wave; a detector, detecting the radio frequency signal to obtain a detection signal; a circuit part, performing signal processing based on reception data obtained by performing demodulation processing on the detection signal; a regulator, in response to receiving an external power source voltage from an external source, generating and supplying an internal power source voltage for operating the circuit part to the circuit part based on the external power source voltage; and a radio wave detection control part, detecting whether or not the antenna is receiving a radio wave and controlling the regulator so that a generation operation of the internal power source voltage by the regulator is stopped in response to the antenna not receiving the radio wave.

DESCRIPTION OF THE EMBODIMENTS

Figure 1:
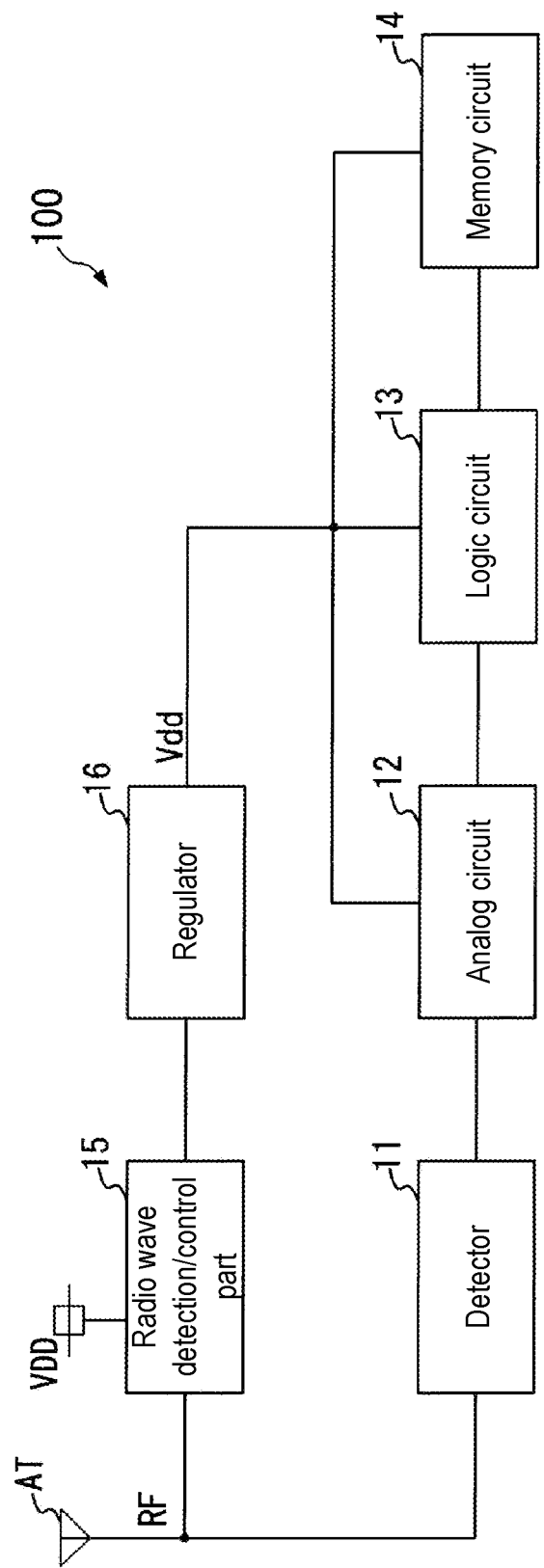
FIG. 1 is a block diagram showing the configuration of the wireless communication device.

An exemplary embodiment of the disclosure will be described in detail below. In addition, in the following description of the embodiment and the accompanying drawings, substantially the same or equivalent parts are given the same reference numerals.

The wireless communication device of the disclosure allows a reduction in power consumption in wireless communication devices that operate by receiving power from an external power source.

Embodiment 1

FIG. 1 is a block diagram showing the configuration of a wireless communication device 100 as a wireless communication device according to the disclosure.

It should be noted that the wireless communication device 100 is a wireless communication device used for a passive RFID tag that receives a radio wave from a reader/writer device (not shown) and correspondingly transmits and receives information to and from the reader/writer device by short-range wireless communication.

As shown in FIG. 1, the wireless communication device 100 includes an antenna AT, a detector 11, an analog circuit 12, a logic circuit 13, a memory circuit 14, a radio wave detection/control part 15, and a regulator 16. Furthermore, the wireless communication device 100 is connected to an external power source such as a battery (not shown) and receives a supply of the external power source voltage VDD from the external power source.

The antenna AT receives a radio wave emitted from the reader/writer device and supplies a radio frequency signal RF corresponding to the radio wave to the detector 11.

The detector 11 supplies a detection signal obtained by detecting the radio frequency signal RF to the analog circuit 12.

The analog circuit 12 performs demodulation processing on the detection signal and restores and supplies the reception data representing various information in digital values transmitted from the reader/writer device to the logic circuit 13. The logic circuit 13, based on the reception data, performs signal processing, which plays the main function as an RFID tag, and stores information data obtained by the signal processing in the memory circuit 14. When performing such signal processing, the logic circuit 13 may read information stored in advance in the memory circuit 14 and reflect this information in the signal processing described above.

It should be noted that the analog circuit 12, the logic circuit 13, and the memory circuit 14 are the main circuit part responsible for the main function of the RFID tag, and while the internal power source voltage Vdd is being supplied from the regulator 16, the above operation may be performed using the internal power source voltage Vdd.

When the radio frequency signal RF is received from the antenna AT, the radio wave detection/control part 15 supplies the external power source voltage VDD supplied from the external power source to the regulator 16.

When the external power source voltage VDD is supplied from the radio wave detection/control part 15, the regulator 16 starts the operation of generating the internal power source voltage Vdd with a predetermined voltage value as the power source voltage to operate the above main circuit part (12 to 14) from the external power source voltage VDD. Then, the regulator 16 supplies the generated internal power source voltage Vdd to the main circuit part, that is, the analog circuit 12, the logic circuit 13, and the memory circuit 14.

Figure 2:
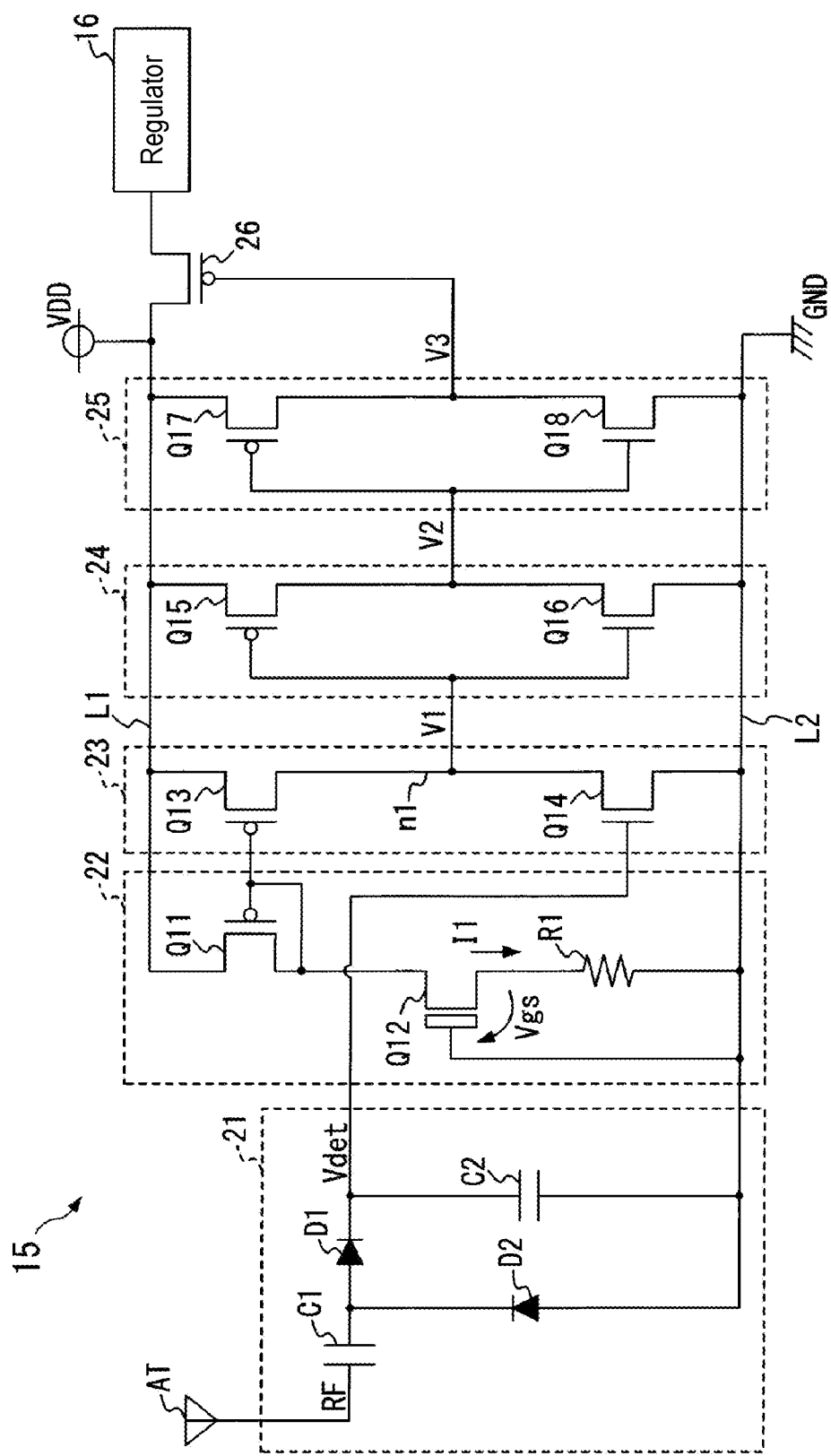
FIG. 2 is a circuit diagram showing the configuration of the radio wave detection/control part.

FIG. 2 is a circuit diagram showing the configuration of the radio wave detection/control part 15.

As shown in FIG. 2, the radio wave detection/control part 15 includes a rectifier circuit 21, a constant current bias circuit 22, a constant current type inverter 23, inverters 24, 25, and a transistor 26 that serves as an output switch.

The rectifier circuit 21 includes a capacitor C1, diodes D1, D2, and a capacitor C2. The capacitor C1 has one end connected to the antenna AT and the other end connected to the anode of the diode D1 and the cathode of the diode D2. The capacitor C2 has one end connected to the cathode of the diode D1 and the other end connected to the anode of the diode D2 and the grounding line L2 which is the supply line of the grounding voltage GND.

With this configuration, the rectifier circuit 21 receives the radio frequency signal RF supplied from the antenna AT. At this time, a DC voltage is generated in the cathode of the diode D1 included in the rectifier circuit 21 by rectifying the radio frequency signal RF. The rectifier circuit 21 generates the voltage generated at the cathode end of this diode D1 as a DC voltage Vdet and supplies the same to the constant current type inverter 23.

Incidentally, when the antenna AT is not receiving the radio wave, the rectifier circuit 21 does not receive the radio frequency signal RF from the antenna AT, in this case, the rectifier circuit 21 generates the DC voltage Vdet having zero volt. On the other hand, when the antenna AT is receiving the radio wave, the rectifier circuit 21 receives the radio frequency signal RF, in this case, the rectifier circuit 21 generates the DC voltage Vdet having a voltage value corresponding to the amplitude of the radio frequency signal RF.

In short, the DC voltage Vdet indicates whether or not the antenna AT is receiving the radio wave, depending on whether the voltage value is zero volt.

The constant current bias circuit 22 includes transistors Q11, Q12 and a resistor R1. It should be noted that the transistor Q11 is a P-channel type (first conductivity type) MOS transistor. The transistor Q12 is constructed as a depression type N-channel MOS transistor having a threshold voltage Vth with a negative voltage lower than the grounding voltage GND.

The transistor Q11 has a source connected to the power source line L1, which is the supply line of the external power source voltage VDD, and a drain connected to the drain of the transistor Q12. The source of the transistor Q12 is connected to one end of the resistor R1. The other end of the resistor R1 and the gate of the transistor Q12 are both connected to the grounding line L2. In this way, since the grounding voltage GND (e.g., zero volt) is applied to the gate of the transistor Q12, the source voltage of the transistor Q12 becomes the product (I1·R1) of the current I1 flowing to the transistor Q12 and the resistor R1. Thus, the gate-source voltage Vgs of the transistor Q12 is $Vgs = 0 - I1 \cdot R1$ $= -I1 \cdot R1.$ Here, as the current I1 increases, the gate-source voltage Vgs increases to the negative side, and the transistor Q12 operates so that the current does not flow. As a result, the constant current bias circuit 22 generates a constant current with a constant current value corresponding to the resistance value of the resistor R1.

The constant current type inverter 23 includes transistors Q13 and Q14. It should be noted that the transistor Q13 is a P-channel type MOS transistor, and the transistor Q14 is an N-channel type MOS transistor.

The transistor Q13 has a source connected to the power source line L1 and a gate connected to the gate and the drain of the transistor Q11. The drain of the transistor Q13 is connected to the drain of the transistor Q14 through the node n1. The transistor Q14 has a source connected to the grounding line L2 and a gate to which the DC voltage Vdet generated by the rectifier circuit 21 is applied.

Thus, since a current mirror circuit is formed between the transistor Q11 of the constant current bias circuit 22 and the transistor Q13 of the constant current type inverter 23, a constant current with a constant current value that copies the constant current flowing in the constant current bias circuit 22 flows to the transistor Q13.

In this case, the transistor Q14 of the constant current type inverter 23 is in the on state when the DC voltage Vdet received at the gate is equal to or greater than the threshold voltage Vth, and in the off state when the same is less than the threshold voltage Vth. It should be noted that when the antenna AT is not receiving the radio wave, the DC voltage Vdet is less than the threshold voltage Vth, so the transistor Q14 is in the off state. On the other hand, when the antenna AT is receiving the radio wave, the DC voltage Vdet is equal to or greater than the threshold voltage Vth, so the transistor Q14 is in the on state. Here, while the transistor Q14 is in the off state, a voltage with the external power source voltage VDD is generated at the node n1 of the constant current type inverter 23 by the constant current flowing in the transistor Q13. On the other hand, while the transistor Q14 is in the on state, the voltage value of the node n1 becomes the grounding voltage GND.

Thus, the constant current type inverter 23 supplies such a voltage of the node n1 to the inverter 24 as a reception sensing signal V1, which is a binary value (VDD, GND) indicating whether or not the antenna AT is receiving the radio wave. It should be noted that the reception sensing signal V1 has the grounding voltage GND when the antenna AT is receiving the radio wave and has the external power source voltage VDD when the antenna AT is not receiving the radio wave.

The inverter 24 includes transistors Q15 and Q16. It should be noted that the transistor Q15 is a P-channel type MOS transistor, and the transistor Q16 is an N-channel type MOS transistor. The source of the transistor Q15 is connected to the power source line L1, and the source of the transistor Q16 is connected to the grounding line L2. The gates of the transistors Q15 and Q16 are connected to each other, and the above-mentioned reception sensing signal V1 is received at the gates. The drains of the transistors Q15 and Q16 are connected to each other.

With such a configuration, the inverter 24 supplies a signal having a voltage obtained by inverting the voltage value of the binary (VDD, GND) reception sensing signal V1 as the inverted reception sensing signal V2 to the inverter 25.

The inverter 25 includes transistors Q17 and Q18. It should be noted that the transistor Q17 is a P-channel type MOS transistor, and the transistor Q18 is an N-channel type MOS transistor. The source of the transistor Q17 is connected to the power source line L1, and the source of the transistor Q18 is connected to the grounding line L2. The gates of the transistors Q17 and Q18 are connected to each other, and the above-mentioned inverted reception sensing signal V2 is received at the gates. The drains of the transistors Q17 and Q18 are connected to each other.

With such a configuration, the inverter 25 supplies a signal having a voltage obtained by inverting the voltage value of the binary (VDD, GND) inverted reception sensing signal V2 as the reception sensing signal V3 to the gate of the transistor 26, which is a P-channel type MOS transistor.

The transistor 26 has a source connected to the power source line L1 and a drain connected to the regulator 16.

The transistor 26 is in the off state when the reception sensing signal V3 has the external power source voltage VDD, which indicates that the antenna AT is not receiving the radio wave. On the other hand, when the reception sensing signal V3 has the grounding voltage GND, which indicates that the antenna AT is receiving the radio wave, the transistor 26 becomes the on state and supplies the external power source voltage VDD supplied to the power source line L1 to the regulator 16.

Thus, with the configuration shown in FIG. 2, when the antenna AT is receiving the radio wave, the radio wave detection/control part 15 supplies the external power source voltage VDD to the regulator 16 through the transistor 26 as an output switch. On the other hand, when the antenna AT is not receiving the radio wave, the radio wave detection/control part 15 stops the supply of the external power source voltage VDD to the regulator 16 by putting the transistor 26 in the off state. By stopping the supply of the external power source voltage VDD, the regulator 16 stops the generation operation of the internal power source voltage Vdd.

In this way, the wireless communication device 100 stops the operation of the regulator 16 by stopping the supply of the external power source voltage VDD to the regulator 16 in a non-reception state of the radio wave. As a result, during the non-reception state of the radio wave, the main operation current flowing in the wireless communication device 100 is only the constant current flowing in the constant current bias circuit 22. Thus, the regulator 16 operates even in the non-reception state of the radio wave, and power consumption may be reduced compared to the case where current flows in each circuit (12 to 14) connected to that regulator.

Furthermore, the DC voltage Vdet generated by the rectifier circuit 21 shown in FIG. 2 is supplied to the gate of the transistor Q14 of the constant current type inverter 23, and the rectifier circuit 21 does not supply the current to operate other circuits. Thus, the internal power source voltage is generated to operate all circuits using the output of the rectifier circuit, compared to a communication circuit mounted on a so-called passive RFID tag, a relatively high voltage may be obtained from a small reception input, thereby increasing the communication sensitivity.

Embodiment 2

Figure 3:
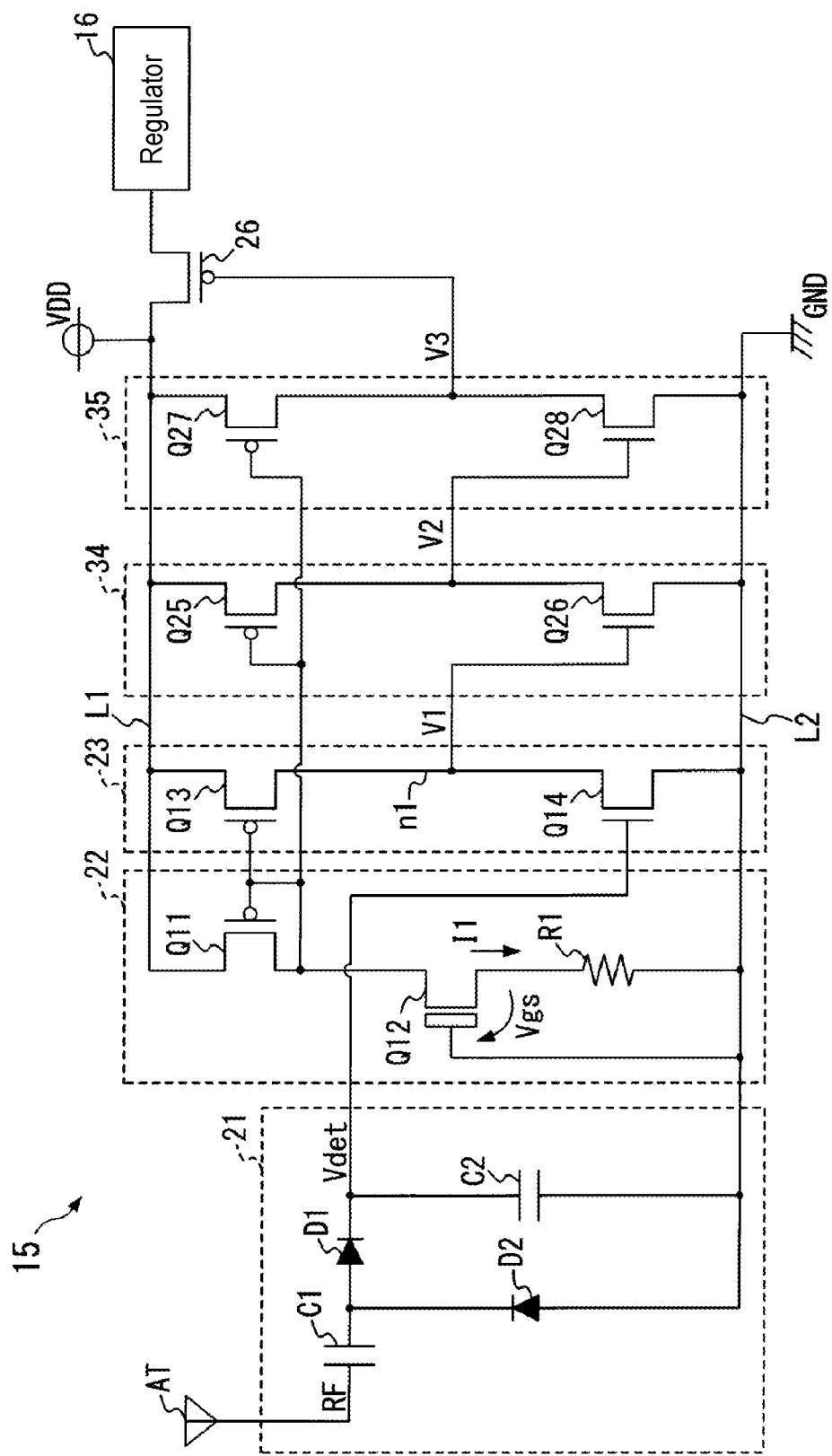
FIG. 3 is a circuit diagram showing the modification example of the radio wave detection/control part shown in FIG. 2.

FIG. 3 is a circuit diagram showing the modification example of the radio wave detection/control part 15 shown in FIG. 2.

The configuration shown in FIG. 3 is the same as that shown in FIG. 2 except that constant current type inverters 34 and 35 are used instead of the inverters 24 and 25 shown in FIG. 2.

The constant current type inverter 34 includes transistors Q25 and Q26. It should be noted that the transistor Q25 is a P-channel type MOS transistor, and the transistor Q26 is an N-channel type MOS transistor.

The transistor Q25 has a source connected to the power source line L1 and a gate connected to the gate and the drain of the transistor Q11 of the constant current bias circuit 22. The drain of the transistor Q26 is connected to the drain of the transistor Q25. The transistor Q26 has a source connected to the grounding line L2 and a gate connected to the drains of the transistors Q13 and Q14 of the constant current type inverter 23 through the node n1.

The constant current type inverter 35 includes transistors Q27 and Q28. It should be noted that the transistor Q27 is a P-channel type MOS transistor, and the transistor Q28 is an N-channel type MOS transistor.

The transistor Q27 has a source connected to the power source line L1 and a gate connected to the gate and the drain of the transistor Q11 of the constant current bias circuit 22. The drain of the transistor Q27 is connected to the drain of the transistor Q28. The transistor Q28 has a source connected to the grounding line L2 and a gate connected to the drains of the transistors Q25 and Q26 of the constant current type inverter 34.

Incidentally, the operation of the constant current type inverter 34 shown in FIG. 3 is the same as the operation of the inverter 24, which receives the binary (VDD, GND) reception sensing signal V1 and generates the inverted reception sensing signal V2 having a voltage obtained by inverting the voltage value. In addition, the operation of the constant current type inverter 34 shown in FIG. 3 is the same as the operation of the inverter 25, which receives the binary (VDD, GND) inverted reception sensing signal V2 and generates and supplies the reception sensing signal V3 having a voltage obtained by inverting the voltage value to the gate of the transistor 26.

However, in the constant current type inverters 34 and 35, the current flowing inside each is limited to a current value corresponding to the current I1 flowing inside the constant current bias circuit 22.

As a result, since the voltage generated at the node n1 of the constant current type inverter 23 becomes an intermediate potential between the external power source voltage VDD and the grounding voltage GND, all transistors Q25 to Q28 are now in the on state, and even if a through current flows between the transistors Q25 (Q27) and Q26 (Q28), the current value is limited to the current value corresponding to the current I1. Thus, even if a through current flows in each inverter (34, 35), the current value is able to be reduced.

It should be noted that in the above embodiment, although the reception sensing signal V1, which is the output of the constant current type inverter 23, is supplied to the gate of the transistor 26 through the two-stage inverters 24 and 25 in series or the two-stage constant current type inverters 34 and 35 in series as the reception sensing signal V3, the reception sensing signal V1 may be directly supplied to the gate of the transistor 26.

In addition, in the above embodiment, when the antenna AT is not receiving the radio wave, the radio wave detection/control part 15 may stop the generation operation of the internal power source voltage Vdd by the regulator 16 by stopping the supply of the external power source voltage VDD to the regulator 16. However, the regulator 16 is configured to always receive the supply of the external power source voltage VDD, and in this case, when the antenna AT is not receiving the radio wave, the radio wave detection/control part 15 may stop the generation operation of the internal power source voltage Vdd by supplying a stop control signal to the regulator 16.

Furthermore, in the embodiment mentioned above, the operation has been explained using an example where the radio wave detection/control part 15 and the regulator 16 shown in FIG. 1 are applied to the wireless communication device of the RFID tag. However, they are applicable not only to RFID tags but also to various wireless communication devices equipped with a function to wait for reception.

In short, the wireless communication device according to the disclosure may be any device that includes: an antenna, a detector, a regulator, and a radio wave detection/control part.

When receiving a radio wave, the antenna (AT) transmits a radio frequency signal (RF) corresponding to the radio wave. The detector (11) detects the radio frequency signal to obtain a detection signal. The circuit part (12 to 14) performs signal processing based on the reception data obtained by performing demodulation processing on this detection signal. When receiving an external power source voltage (VDD) from an external source, the regulator (16) generates and supplies an internal power source voltage (Vdd) for operating the above-mentioned circuit part to the circuit part based on this external power source voltage. The radio wave detection control part detects whether or not the antenna is receiving a radio wave and controls the regulator so that the generation operation of the internal power source voltage by the regulator is stopped in response to the antenna is in the state where the radio wave is not received.

What is claimed is:

1. A wireless communication device, comprising:
an antenna, in response to receiving a radio wave from an external source, transmitting a radio frequency signal corresponding to the radio wave from the external source;
a detector, detecting the radio frequency signal to obtain a detection signal;
a circuit part, performing signal processing based on reception data obtained by performing demodulation processing on the detection signal;
a regulator, in response to receiving an external power source voltage from an external source, generating and supplying an internal power source voltage for operating the circuit part to the circuit part based on the external power source voltage; and
a radio wave detection control part, detecting whether or not the antenna is receiving the radio wave from the external source and controlling the regulator so that a generation operation of the internal power source voltage by the regulator is stopped in response to the antenna not receiving the radio wave from the external source.

2. The wireless communication device according to claim 1, wherein the radio wave detection control part receives the external power source voltage, supplies the external power source voltage to the regulator in response to the antenna receiving the radio wave from the external source, and stops a supply of the external power source voltage to the regulator in response to the antenna not receiving the radio wave from the external source.

3. The wireless communication device according to claim 2, wherein the radio wave detection control part comprises:
a rectifier circuit, rectifying the radio frequency signal to obtain a DC voltage;
a constant current bias circuit, generating a constant current with a constant current value based on the external power source voltage;
a constant current type inverter, generating a voltage as a reception sensing signal, wherein the voltage is generated in a first node by connecting or disconnecting the first node, in which a current obtained by copying the constant current generated by the constant current bias circuit flows, and a grounding line based on a voltage value of the DC voltage; and
an output switch, set to an on state or an off state corresponding to the reception sensing signal, supplying the external power source voltage to the regulator in response to being set to the on state, and stopping the supply of the external power source voltage to the regulator in response to being set to the off state.

4. The wireless communication device according to claim 3, wherein the constant current bias circuit comprises:
a first transistor, having a source receiving the external power source voltage and a gate and a drain connected to each other;
a depression type second transistor, having a drain connected to the drain of the first transistor and a gate connected to the grounding line; and
a resistor, having one end connected to a source of the second transistor and other end connected to the grounding line,
wherein the constant current type inverter comprises:
a third transistor, having a source receiving the external power source voltage and a gate connected to the gate of the first transistor; and
a fourth transistor, having a drain connected to a drain of the third transistor through the first node, a source connected to the grounding line, and a gate receiving the DC voltage.

* * * * *